(12) United States Patent
Murphy

(10) Patent No.: US 10,248,170 B2
(45) Date of Patent: Apr. 2, 2019

(54) VERY LOW DRAFT HOUSINGS AND METHODS OF MANUFACTURING

(71) Applicant: Microsoft Technology Licensing, LLC, Redmond, WA (US)

(72) Inventor: Luke Michael Murphy, Nort Bend, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/404,360

(22) Filed: Jan. 12, 2017

(65) Prior Publication Data

US 2018/0196480 A1 Jul. 12, 2018

(51) Int. Cl.
| | | |
|---|---|---|
| H02G 3/08 | (2006.01) | |
| G06F 1/18 | (2006.01) | |
| B29C 45/00 | (2006.01) | |
| B29C 45/26 | (2006.01) | |
| B29L 31/34 | (2006.01) | |
| B29K 69/00 | (2006.01) | |
| B29K 101/12 | (2006.01) | |

(52) U.S. Cl.
CPC .......... *G06F 1/181* (2013.01); *B29C 45/0025* (2013.01); *B29C 45/2602* (2013.01); *B29C 2045/0034* (2013.01); *B29K 2069/00* (2013.01); *B29K 2101/12* (2013.01); *B29K 2905/02* (2013.01); *B29K 2905/12* (2013.01); *B29L 2031/3481* (2013.01)

(58) Field of Classification Search
CPC . G06F 1/181; B29C 45/0025; B29C 45/2602; B29C 2045/0034; B29K 2069/00; B29K 2101/12; B29K 2905/02; B29K 2905/12; B29K 2031/3481; H02G 3/08; H02G 3/081; H05K 5/00; H05K 5/02; B29L 2031/3481
USPC ............ 174/50, 520, 480, 481; 220/3.2, 3.3, 220/4.02; 361/600, 601, 679.01, 730, 752
See application file for complete search history.

(56) References Cited

U.S. PATENT DOCUMENTS

| | | | | |
|---|---|---|---|---|
| 3,193,132 A | * | 7/1965 | Gray ........................ | H02G 3/14 174/50 |
| 4,790,973 A | | 12/1988 | Minami et al. | |
| 6,323,418 B1 | * | 11/2001 | Tiburtius ............. | H05K 9/0015 174/387 |
| 7,166,800 B2 | * | 1/2007 | Shaw ..................... | B65D 7/045 156/69 |

(Continued)

FOREIGN PATENT DOCUMENTS

| | | |
|---|---|---|
| CN | 202293233 U | 7/2012 |
| CN | 10417550 A | 12/2014 |
| CN | 204019902 U | 12/2014 |

OTHER PUBLICATIONS

"Back draft and zero draft conditions", http://webhotel2.tut.fi/projects/caeds/tekstit/inj_cast_design/castingdesign_backdraft.pdf, Published on: Nov. 1, 2016, pp. 1-3.

*Primary Examiner* — Angel R Estrada
(74) *Attorney, Agent, or Firm* — Ray Quinney & Nebeker P.C.; Paul N. Taylor

(57) ABSTRACT

A housing and methods of manufacturing a housing are described. The housing may include a plurality of faces and a plurality of surfaces. Two of the plurality of surfaces may be parallel to within 1 degree. The at least two of the plurality of surfaces are without parting lines formed by interfacing tool components.

15 Claims, 11 Drawing Sheets

(56) References Cited

U.S. PATENT DOCUMENTS

| | | |
|---|---|---|
| 7,381,051 B2 | 6/2008 | Wang et al. |
| 8,012,398 B2 | 9/2011 | Zadesky et al. |
| 8,124,872 B2 * | 2/2012 | Vigorito .................. H05K 5/02 174/50 |
| 8,253,016 B1 * | 8/2012 | Baldwin ................ H02G 3/081 174/50 |
| 8,371,842 B2 | 2/2013 | Li et al. |
| 8,517,716 B2 | 8/2013 | Wang et al. |
| 8,739,997 B1 * | 6/2014 | Ploof ....................... H02G 3/14 16/282 |
| 9,004,908 B1 | 4/2015 | Liu et al. |
| 9,321,194 B2 | 4/2016 | Suiter |
| 2014/0323981 A1 | 10/2014 | Giraud et al. |
| 2015/0197053 A1 | 7/2015 | Szeremeta et al. |
| 2015/0367545 A1 | 12/2015 | Berg et al. |

* cited by examiner

VERY LOW DRAFT HOUSINGS AND METHODS OF MANUFACTURING

BACKGROUND

Background and Relevant Art

Use of computing devices is becoming more ubiquitous by the day. Computing devices range from standard desktop computers to wearable computing technology and beyond. Computing devices may require housings, whether for the computing device itself and/or for accessories for a computing device.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In one embodiment, a housing is described. The housing includes a plurality of faces and a plurality of surfaces. Two of the plurality of surfaces are parallel to within 1 degree. The at least two of the plurality of surfaces are without parting lines formed by interfacing tool components.

In one embodiment, a method of manufacturing a housing is described. The method includes closing a tool. The tool has a core and a sleeve. The tool forms a cavity. The core is separable from the sleeve. The sleeve has opposing sides that are parallel to within 1 degree. The method includes injecting material into the tool to form a part.

In one embodiment, a tool for forming a housing is described. The tool includes a core, a sleeve, and a cavity. The sleeve is selectively connectable to the core. The sleeve includes a plurality of faces and a plurality of surfaces. Two of the plurality of surfaces are parallel to within 1 degree. At least two of the plurality of surfaces are continuous. The cavity is selectively connectable to the sleeve.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to very low draft housings and methods of manufacturing. More particularly, this disclosure generally relates to housings with housings with two sides that are parallel to within one degree or less and methods of manufacturing such housings.

At least one embodiment disclosed herein may include a housing without a parting line on two or more surfaces where the two or more lateral surfaces are within one degree of parallel or intersect and are each within one degree of parallel to a plane, as will be described in more detail throughout.

Figure 1:
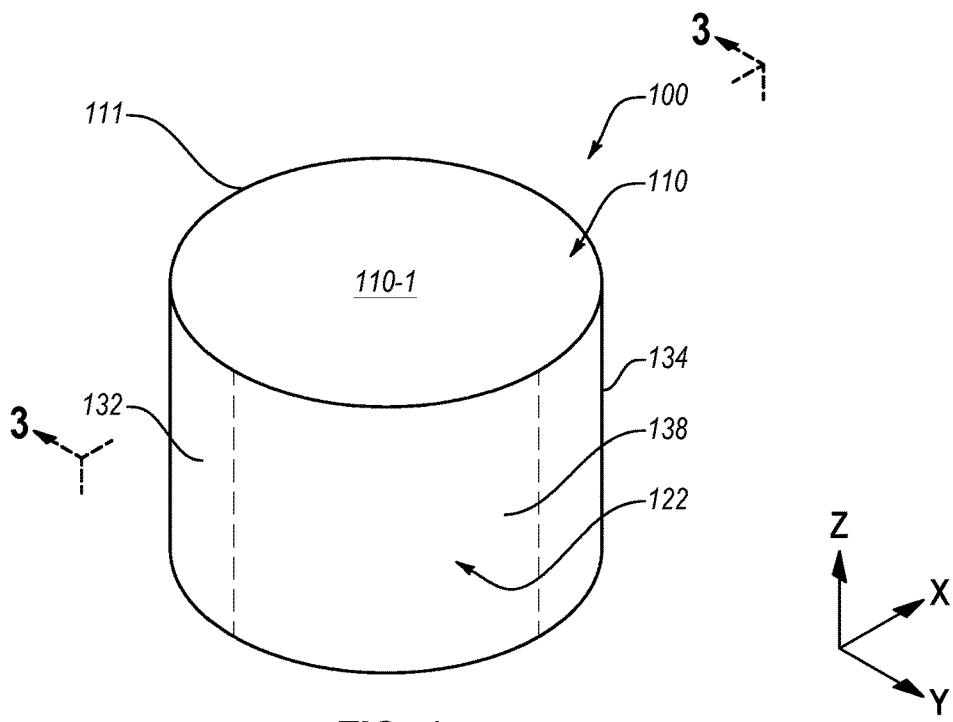
FIG. 1 is an isometric top view of an embodiment of a housing.
Figure 2:
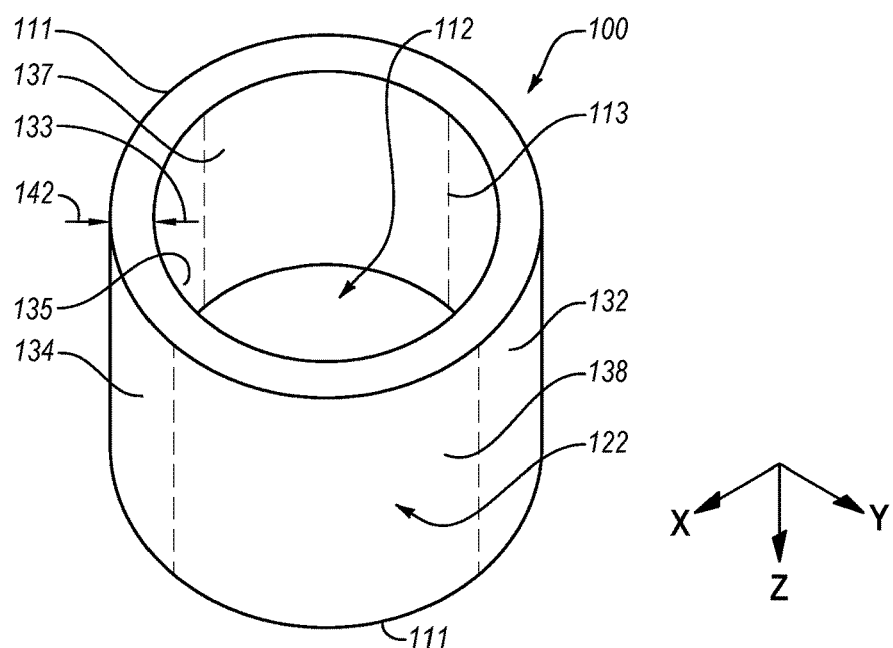
FIG. 2 is an isometric bottom view of the embodiment of a housing in FIG. 1.
Figure 3:
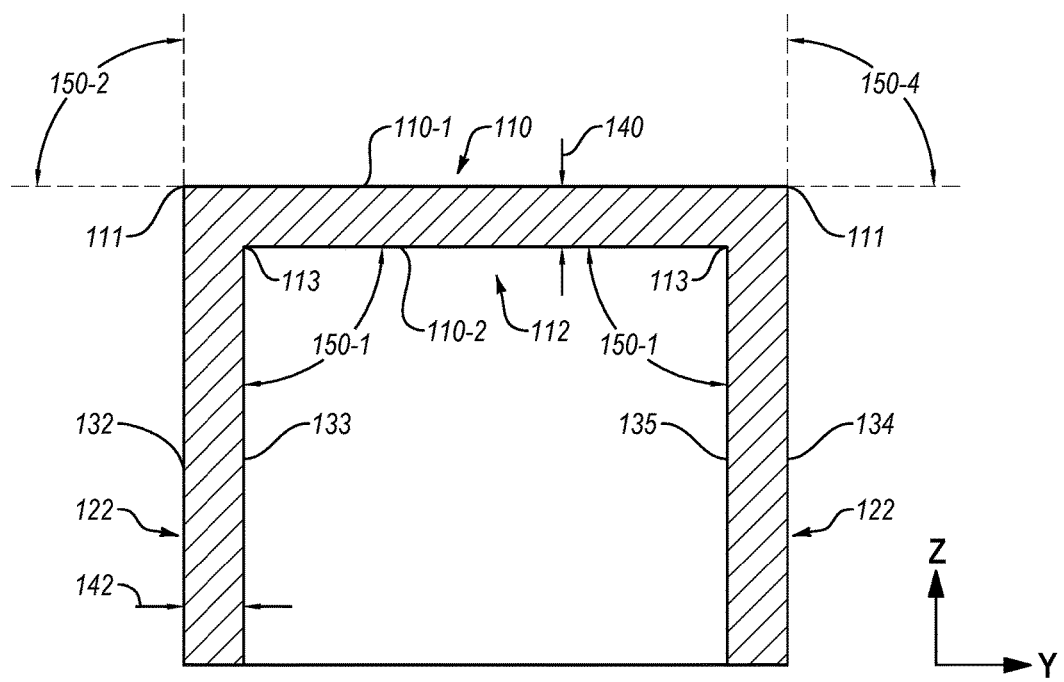
FIG. 3 is a cross sectional view of the embodiment of a housing in FIG. 1 along lines 3-3 of FIGS. 1 and 2.

Housings can be used for many purposes. Typically housings are used to prevent exposure of and/or damage to internal components. Housings come in many shapes and sizes. A housing may include at least one face and one or more lateral faces. As shown in FIGS. 1-3, a housing 100 may include a front face 110, a back face 112, and a lateral face 122. In other embodiments, two or more lateral faces may be used, as shown in FIGS. 4-7, for example.

The front face 110 may include an outer front surface 110-1 and an inner front surface 110-2. The lateral face 122 may include a plurality of outer surfaces. As shown in FIGS. 1-3, the lateral face 122 includes an outer left surface 132, an outer right surface 134, an outer top surface (not shown), and an outer bottom surface 138. The surfaces in FIGS. 1-3 are portions of the lateral face 122 as shown. For example, the outer bottom surface 138 may extend between the phantom lines shown in FIG. 1. The outer left surface 132 may extend from the left phantom line to another phantom line (not shown), the outer right surface 134 may extend from the right phantom line to another phantom line (not shown), and the outer top surface (not shown) may extend between the outer left surface 132 and the outer right surface 134.

The lateral face 122 may include a plurality of inner surfaces. As shown in FIG. 2, the lateral face 122 may include an inner left surface 133, an inner right surface 135, an inner top surface 137, and an inner bottom surface (not shown). The inner surfaces in FIGS. 1-3 are inner portions of the lateral face 122 as shown. For example, the inner top surface 137 may extend between the phantom lines shown in FIG. 2. The inner left surface 133 may extend from the right phantom line to another phantom line (not shown), the inner right surface 135 may extend from the left phantom line to another phantom line (not shown), and the inner bottom surface (not shown) may extend between the inner left surface 133 and the inner right surface 135.

As shown in FIGS. 1-3, the lateral faces 122 and/or surfaces may be planar in the z-direction. In other words, the lateral faces 122 may be planar in the cross-section shown in FIG. 3. In other embodiments, one or more of the lateral faces 122 may vary from planar in the z-direction by less than one degree. In other words, a tangent line drawn from any surface in the z-direction would be less than one degree from parallel from any other tangent line drawn for the same surface in the z-direction. In further embodiments, one or more of the lateral faces 122 may vary from planar in the z-direction by less than one degree, less than 0.75 degrees, less than 0.5 degrees, less than 0.25 degrees or any value therebetween.

Reference axes are provided in some of the Figures to provide a reference frame. As shown in FIGS. 1-3, the faces 110, 112, 122 may be planar in the x-direction and/or y-direction (e.g., the front face 110 and the back face 112 may be planar in the x-direction and y-direction, the outer left surface 132 and the outer right surface 134 may be planar in the y-direction and the z-direction, and the outer top surface 136 and the outer bottom surface 138 may be planar in the y-direction and the z-direction). In other embodiments, one or more of the faces 110, 112, 122 may vary from planar in the x-direction and/or y-direction by less than one degree. In other words, a tangent line drawn from any surface in the x-direction and/or y-direction would be less than one degree from parallel from any other tangent line drawn for the same surface in the x-direction and/or y-direction, respectively. In further embodiments, one or more of the faces 110, 112, 122 may vary from planar in the x-direction and/or y-direction by less than one degree, less than 0.75 degrees, less than 0.5 degrees, less than 0.25 degrees or any value therebetween.

As shown in FIG. 3, the front face 110 may have a thickness 140 and, as shown in FIGS. 2 and 3, the lateral face 122 may have a thickness 142. The thicknesses may be measured between two surfaces. For example, as shown, the thickness 142 is measured between the outer left surface 132 and the inner left surface 133. In the present embodiment, thickness 142 may be uniform about the perimeter (e.g., circumference) of the housing 100. In other embodiments, the thickness may vary about at least a portion of the perimeter and/or in the z-direction.

Two or more faces may be oriented with respect to each other. For example, as shown in FIG. 3, the lateral face 122 may be oriented with respect to the front face 110. In other words, the outer front surface 110-1 of the front face 110 may be oriented with respect to the outer left surface 132 and/or the inner left surface 133.

An angle may be formed between two faces and/or surfaces. For example, the inner left surface 133 and the inner front surface 110-2 may form an angle 150-1, the inner right surface 135 and the inner front surface 110-2 may form an angle 150-2, the outer left surface 132 and the outer front surface 110-1 may form an angle 150-3, and the outer right surface 134 and the outer front surface 110-1 may form an angle 150-4.

As shown in FIG. 3, the outer left surface 132 and the outer right surface 134 are parallel and the inner left surface 133 and the inner right surface 135 are parallel. In other embodiments, two or more of the faces and/or surfaces may be parallel to within one degree. For example, two or more of the outer left surface 232, the inner left surface 133, the outer right surface 134, the inner right surface 135, the outer top surface 136, the inner top surface 137, the outer bottom surface 138, and the inner bottom surface 139 may be parallel to each other to within one degree. For example, the angle 150-3 may be 90 degrees and the angle 150-4 may be 91 degrees. In another example, the angle 150-1 between the inner left surface 133 and the inner front surface 110-2 may be 90.5 degrees and the angle 150-2 between the inner right surface 135 and the inner front surface 110-2 may be 80.5 degrees. In further embodiments, the outer left surface 132 and the outer right surface 134 and/or the inner left surface 133 and the inner right surface 135 may be parallel to within one degree, within 0.75 degrees, within 0.5 degrees, within 0.25 degrees, within 0.1 degrees, within 0.01 degrees, or any value therebetween.

The housing 100 may include a plurality of edges 111, 113. The edges 111, 113 may be interface between faces and/or surfaces. For example, an outer edge 111 is shown between the front face 110 (and/or the outer front surface 110-1) and the lateral face 122 (and/or the outer lateral surfaces 132, 134, 136, 138) and an inner edge 113 is shown between the back face 112 (and/or the inner front surface 110-2) and the lateral face (and/or one or more of the inner lateral surfaces 133, 135, 137). The edges 111, 113 are shown as being straight. In other words, the edges 111, 113 form a line. In other embodiments, the edges 111, 113 may be rounded or otherwise formed.

The faces 110, 112, 122 may be smooth. In other words, the faces 110, 112, 122 may be without parting lines that may be formed by interfacing tool components, as will be described in more detail below. In some embodiments, the front and back faces 110, 112 may include horizontal parting lines, while the lateral faces 122 may be without lateral parting lines.

The housings described herein may be formed of various materials. In at least one embodiment of a housing, the housing may be formed of an amorphous thermoplastic resin. In at least one embodiment, the housing may be formed of polycarbonate ABS or PCABS blend. In at least one embodiment, the housing is formed of a copolymer polycarbonate PolySiloxane blend. In at least one embodiment, the housing is formed of Lexan 9414T.

Figure 4:
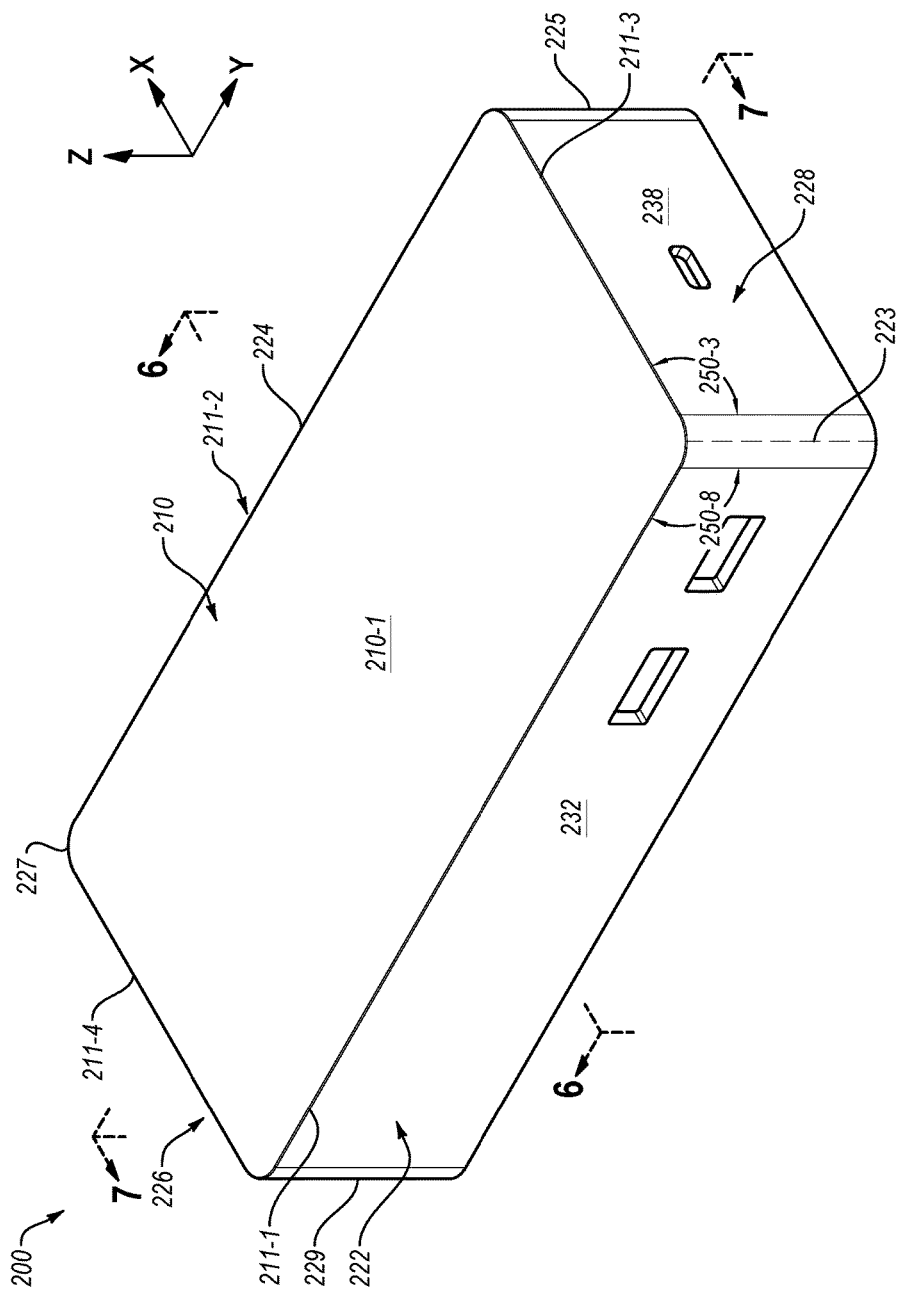
FIG. 4 is an isometric top view of another embodiment of a housing.
Figure 5:
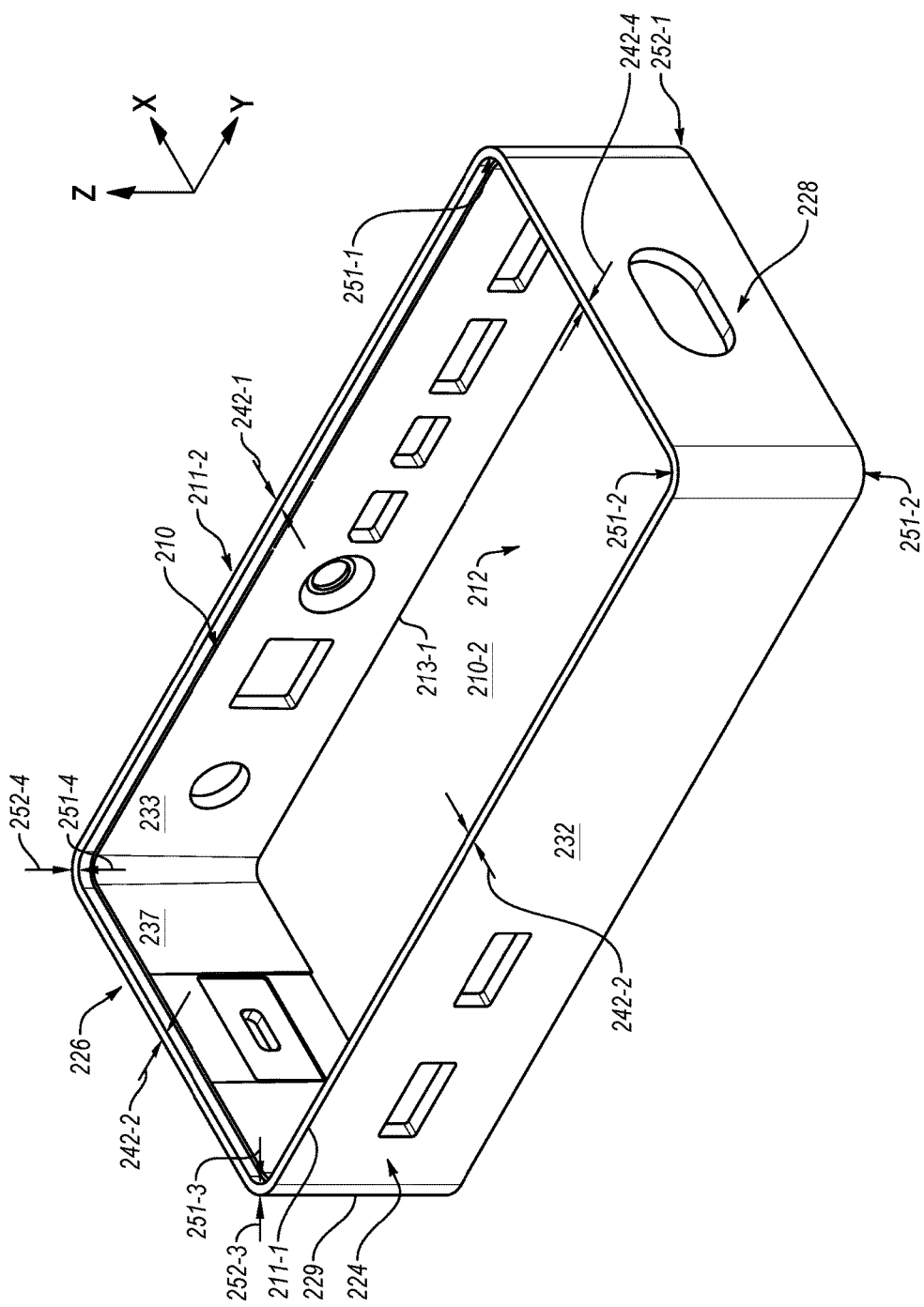
FIG. 5 is an isometric bottom view of the embodiment of a housing in FIG. 4.
Figure 6:
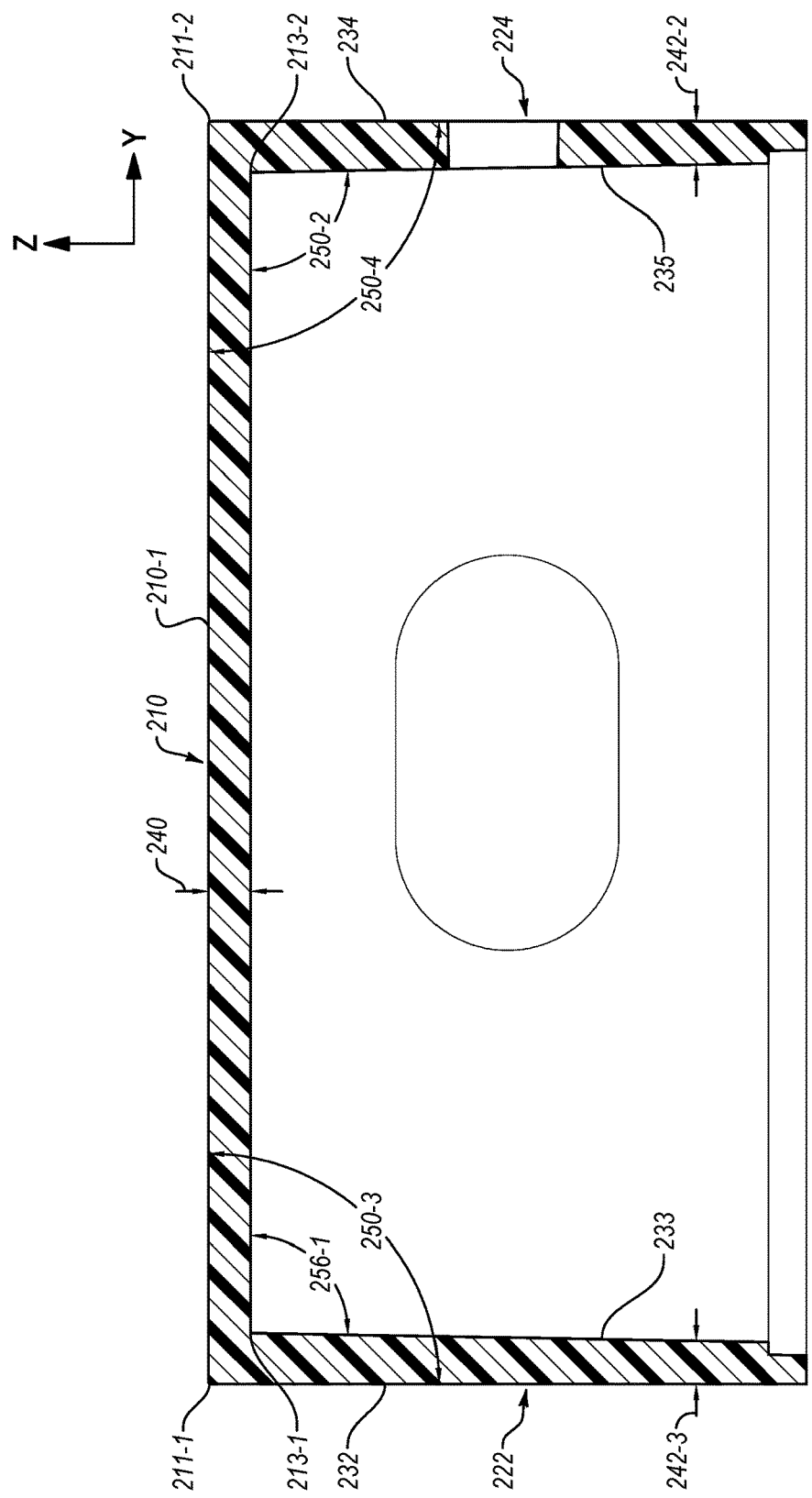
FIG. 6 is a top cross sectional view of the embodiment of a housing in FIG. 4 along lines 6-6 of FIGS. 4 and 5.

As shown in FIGS. 4-6, a housing 200 may include a front face 210, a back face 212, and four lateral faces (e.g., left face 222, right face 224, top face 226, and bottom face 228). In other embodiments, a single lateral face or two or more lateral faces may be used.

The front face 210 may include an outer front surface 210-1 and an inner front surface 210-2. The lateral face 222 may include a plurality of outer surfaces. As shown in FIGS. 4-6, the left face 222 may include an outer left surface 232, the right face 224 may include an outer right surface 234, the top face 226 may include an outer top surface (not shown), and the bottom face 228 may include an outer bottom surface 238. As described above more or fewer faces with more or few surfaces may be used.

Figure 7:
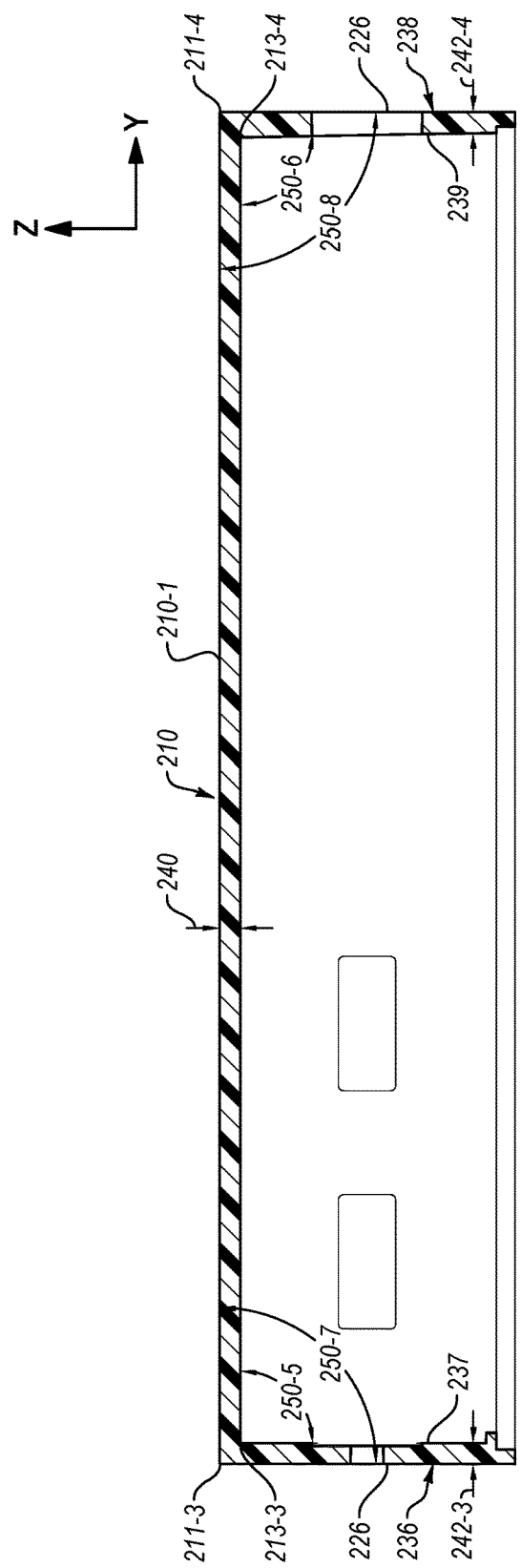
FIG. 7 is a left cross sectional view of the embodiment of a housing in FIG. 4 along lines 7-7 of FIGS. 4 and 5.

The faces 222, 224, 226, 228 may include a plurality of inner surfaces. As shown in FIGS. 5-7, the left face 222 may include an inner left surface 233, the right face 224 may include an inner right surface 235, the top surface 236 may include an inner top surface 237, and the bottom surface 238 may include an inner bottom surface 239.

As shown in FIGS. 4-7, the left face 222, right face 224, top face 226, bottom face 228, and combinations thereof and/or surfaces thereof may be planar in the z-direction. In other words, the left face 222 and the right face 224 may be planar in the cross-section shown in FIG. 6 and the top face 226 and the bottom face 228 may be planar in the cross-section shown in FIG. 7. In other embodiments, one or more of the left face 222, right face 224, top face 226, and bottom face 228 may vary from planar in the z-direction by less than one degree. In other words, a tangent line drawn from any surface in the z-direction would be less than one degree from parallel from any other tangent line drawn for the same surface in the z-direction. In further embodiments, one or more of the left face 222, right face 224, top face 226, and bottom face 228 may vary from planar in the z-direction by less than one degree, less than 0.75 degrees, less than 0.5 degrees, less than 0.25 degrees or any value therebetween.

As shown in FIGS. 4-7, the faces 210, 212, 222, 224, 226, 228 may be planar in the x-direction and/or y-direction (e.g., the front face 210 and the back face 212 may be planar in the x-direction and y-direction, the left face 222 and the right face 224 may be planar in the y-direction and the z-direction, and the top face 226 and the bottom face 228 may be planar in the y-direction and the z-direction). In other embodiments, one or more of the faces 210, 212, 222, 224, 226, 228 may vary from planar in the x-direction and/or y-direction by less than one degree. In other words, a tangent line drawn from any surface in the x-direction and/or y-direction would be less than one degree from parallel from any other tangent line drawn for the same surface in the x-direction and/or y-direction, respectively. In further embodiments, w one or more of the faces 210, 212, 222, 224, 226, 228 may vary from planar in the x-direction and/or y-direction by less than one degree, less than 0.75 degrees, less than 0.5 degrees, less than 0.25 degrees or any value therebetween.

The front face 210 may have a thickness 240 and, as shown in FIGS. 6-7, the left face 222 may have a thickness 242-1, the right face 224 may have a thickness 242-2, the top face 226 may have a thickness 242-3, and the bottom face 228 may have a thickness 242-4. The thicknesses may be measured between two surfaces. For example, as shown, the thickness 242-1 is measured between the outer left surface 232 and the inner left surface 233. In the present embodiment, one or more of the thicknesses 242 may be uniform about the perimeter of the housing 200. In other embodiments, the thickness may vary about at least a portion of the perimeter and/or in the z-direction. The thicknesses 242 may be 0.25 mm, 0.5 mm, 1 mm, 2 mm, 5 mm, any values therebetween, or ranges therebetween. In one embodiment, the thickness of one or more faces of a housing may be less than 1 mm.

Two or more faces may be oriented with respect to each other. For example, as shown in FIG. 6, the left face 222 may be oriented with respect to the front face 210. In other words, the outer surface 210-1 of the front face 210 may be oriented with respect to the outer left surface 232 and/or the inner left surface 233. In another example, as shown in FIG. 5, the right face 224 and the bottom face 228 may be oriented with respect to each other. In other words, the outer right surface 234 and/or the inner right surface 235 may be oriented with respect to the outer bottom surface 238 and/or the inner bottom surface 239.

An angle may be formed between two faces and/or surfaces. For example, as shown in FIG. 6, the inner left surface 233 and the inner front surface 210-2 may form an angle 150-1, the inner right surface 235 and the inner front surface 210-2 may form an angle 150-2, the outer left surface 232 and the outer front surface 210-1 may form an angle 150-3, and the outer right surface 234 and the outer front surface 210-1 may form an angle 150-4. In another example, as shown in FIG. 7, the inner top surface 237 and the inner front surface 210-2 may form an angle 150-5, the inner bottom surface 239 and the inner front surface 210-2 may form an angle 150-6, the outer top surface 236 and the outer front surface 210-1 may form an angle 150-7, and the outer bottom surface 238 and the outer front surface 210-1 may form an angle 150-8.

As shown in FIGS. 6-7, the outer left surface 232 and the outer right surface 234 are parallel, the inner left surface 233 and the inner right surface 235 are parallel, the outer top surface 236 and the outer bottom surface 238 are parallel, and the inner top surface 237 and the inner bottom surface 239 are parallel. In other embodiments, two or more of the faces and/or surfaces may be parallel to within one degree. For example, two or more of the outer left surface 232, the inner left surface 233, the outer right surface 234, the inner right surface 235, the outer top surface 236, the inner top surface 237, the outer bottom surface 238, and the inner bottom surface 239 may be parallel to each other to within one degree. For example, the angle 150-3 may be 90 degrees and the angle 150-4 may be 91 degrees. In another example, the angle 150-5 between the inner top surface 237 and the inner front surface 210-2 may be 90.5 degrees and the angle 150-6 between the inner bottom surface 239 and the inner front surface 210-2 may be 80.5 degrees. In further embodiments, the two or more of the outer left surface 232, the inner left surface 233, the outer right surface 234, the inner right surface 235, the outer top surface 236, the inner top surface 237, the outer bottom surface 238, and the inner bottom surface 239 may be parallel to within one degree, within 0.75 degrees, within 0.5 degrees, within 0.25 degrees, within 0.1 degrees, within 0.01 degrees, or any value therebetween.

The housing 200 may include a plurality of horizontal edges 211-1, 211-2, 211-3, 211-4, 213-1, 213-2, 213-3, 213-4. The horizontal edges 211, 213 may be interfaces between a horizontal face (e.g., front face 210 or back face 212) or horizontal surface (e.g., outer front surface 210-1 or inner front surface 210-2) and a lateral face (e.g., left face 222, right face, 224, top face 226, or bottom face 228) or lateral surfaces (e.g., the outer left surface 232, the inner left surface 233, the outer right surface 234, the inner right surface 235, the outer top surface 236, the inner top surface 237, the outer bottom surface 238, and the inner bottom surface 239). For example, outer horizontal edges 211-1, 211-2, 211-3, 211-4 are shown between the front face 210 (and/or the outer front surface 210-1) and the lateral faces (e.g., the left face 222, the right face 224, the top face 226, and the bottom face 228) and/or one or more of the outer lateral surfaces (e.g., the outer left surface 232, the outer right surface 234, the outer top surface 236, the outer bottom surface 238), respectively and inner horizontal edges 213-1, 213-2, 213-3, 213-4 are shown between the back face 212 (and/or the inner front surface 210-2) and the lateral faces (e.g., the left face 222, the right face 224, the top face 226, and the bottom face 228) and/or one or more of the inner lateral surfaces (e.g., the inner left surface 233, the inner right surface 235, the inner top surface 237, the inner bottom surface 239).

The housing 200 may include a plurality of lateral edges 223, 225, 227, 229. The lateral edges 223, 225, 227, 229 may be interfaces between two lateral faces (e.g., left face 222, right face, 224, top face 226, or bottom face 228) or lateral surfaces (e.g., the outer left surface 232, the inner left surface 233, the outer right surface 234, the inner right surface 235, the outer top surface 236, the inner top surface 237, the outer bottom surface 238, and the inner bottom surface 239). For example, a first lateral edge 223 is formed between the left face 222 and the bottom face 228, a second lateral edge 225 is formed between the bottom face 228 and the right face 224, a third lateral edge 227 is formed between the right face 224 and the top face 226, and a fourth lateral edge 229 is formed between the top face 226 and the left face 222.

The horizontal edges 211, 213 are shown as being straight while the lateral edges 223, 225, 227, 229 are shown as being curved. In other words, in some embodiments, the horizontal edges 211, 213 form a line and the lateral edges 223, 225, 227, 229 are radiused. In other embodiments, the horizontal edges 211, 213 may be rounded or otherwise formed and/or the lateral edges 223, 225, 227, 229 may be straight or otherwise formed.

The lateral edges 223, 225, 227, 229 are shown with an inner radius 251 and/or an outer radius 252. The inner radius 251 and the outer radius 252 of each respective lateral edge may be the same or may differ. As shown, for example, the first lateral edge 223 includes an inner radius 251-1 and an outer radius 252-1 that are the same while the second lateral edge 225 may include an inner radius 251-2 and an outer radius 252-2 that may differ.

The radius at one or more edges (e.g., lateral, horizontal, or other edges) may be uniform (e.g., the same) or may vary. In some embodiments, the radiuses at one or more edges may be 0.25 mm, 0.5 mm, 0.75 mm, 1 mm, 2 mm, 5 mm, any value therebetween.

In some embodiments, one or more of the horizontal edges 211, 213 formed between the front face 210 and/or the back face 212 and one or more faces may include parting lines. In at least one embodiment, at least two of the surfaces are formed without parting lines. In at least one embodiment, as least two of the surfaces are formed without lateral parting lines. Parting lines may also manifest as mismatched steps.

Parting lines may have a height extending beyond a surface. In at least one embodiment, two or more surfaces of a housing may not have any parting lines with a height greater than 0.01 mm, 0.03 mm, 0.05 mm, 0.125 mm, or any value therebetween. In at least one embodiment, the parting line may be so small that it cannot be visibly seen by the naked eye from 18 inches under CWF lighting while viewing for 5 seconds by a user with 20/20 vision.

The faces 210, 212, 222, 224, 226, 228 may be smooth. In other words, two or more of the faces 210, 212, 222, 224, 226, 228 may be without parting lines, lateral parting lines, or combinations thereof that may be formed by interfacing tool components, as will be described in more detail below.

Figure 8:
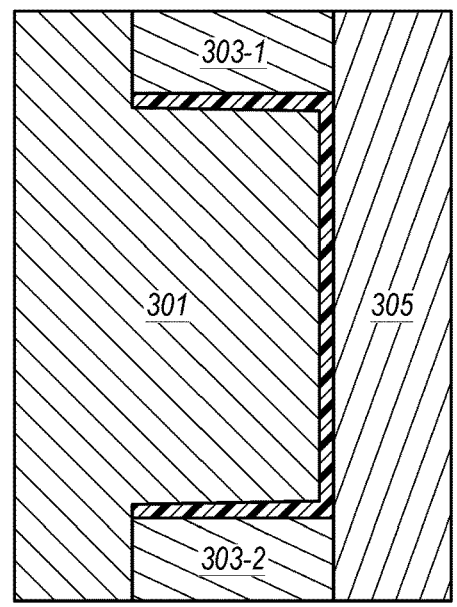
FIG. 8 is a top cross sectional view of an embodiment of a tool assembly for manufacturing a part.
Figure 9:
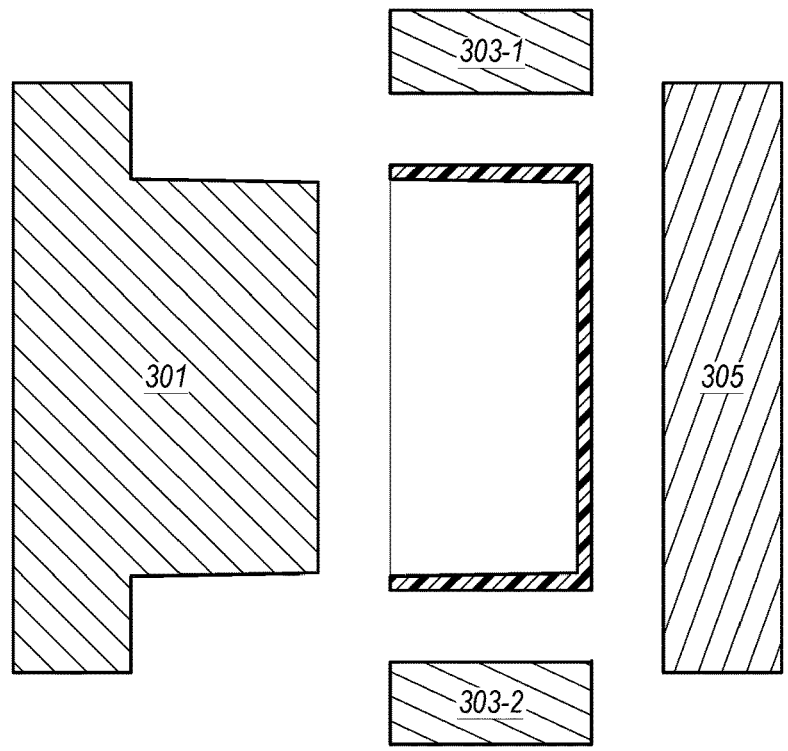
FIG. 9 is an exploded top cross sectional view of the tool assembly of FIG. 8.
Figure 10:
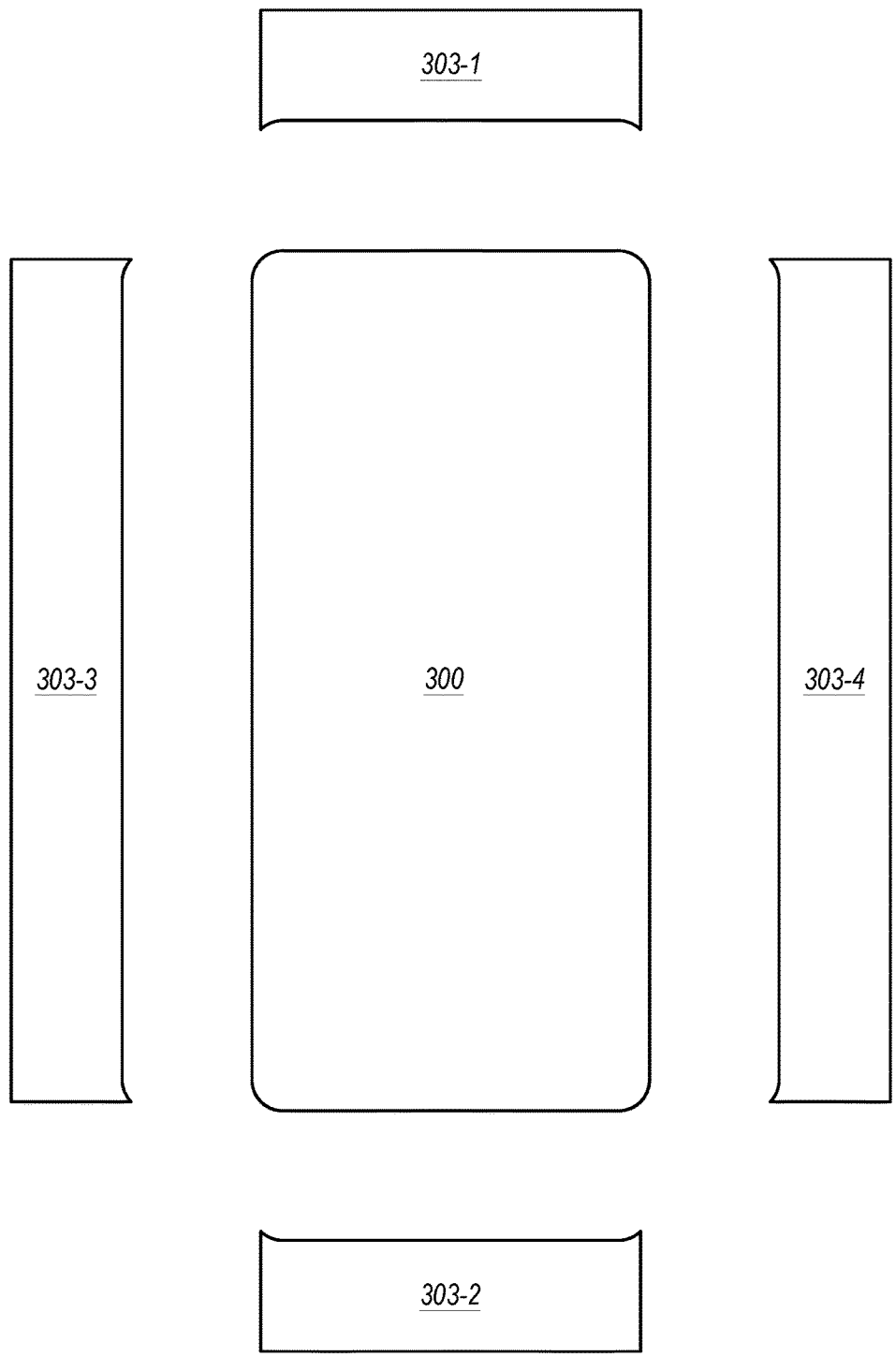
FIG. 10 is a front exploded view of the sliders of the tool assembly and the part of FIG. 8.

Parting lines are typically formed in an injection molded part. FIGS. 8-10 illustrate an example of a conventional method of manufacturing a housing. The method includes injecting a material into a tool formed by a cavity 301, two or more sliders 303-1, 303-2, and a core 305. As shown in FIG. 8, the cavity 301, sliders 303-1, 303-2, and the core 305 abut each other as the material is injected to form a part. Once the part is formed, the two or more sliders 303-1, 303-2, 303-3, 303-4 and the cavity 301 and/or core 305 are moved away from the part, as shown in FIGS. 9 and 10.

Parting lines are typically formed at the interfaces of the tool. Interfaces are formed where each tool component (e.g., the cavity 301, sliders 303, and the core 305) intersects another tool component. As shown in FIGS. 8-10, a part formed by this example conventional method and tool would typically have horizontal parting lines at the interface between the cavity 301 and the first slider 303-1, the cavity 301 and the second slider 303-2, the cavity 301 and the third slider 303-3, the cavity 301 and the fourth slider 303-4, the core 305 and the first slider 303-1, the core 305 and the second slider 303-2, the core 305 and the third slider 303-3, and the core 305 and the fourth slider 303-4. A part formed by this example conventional method and tool would typically have lateral (e.g., vertical in this example) parting lines at the interface between each slider 303 (e.g., between the first slider 303-1 and the second slider 303-2, between the second slider 303-2 and the third slider 303-3, between the third slider 303-3 and the fourth slider 303-4, and between the fourth slider 303-4 and the first slider 303-1). In other embodiments, other lateral parting lines may be formed.

In at least one embodiment of a housing, two or more lateral faces may be free from parting lines along their entire surface (e.g., outer or inner surface). In at least one embodiment of a housing, two or more lateral faces may be free from lateral parting lines along their entire surface (e.g., outer or inner surface). In at least one embodiment of a housing, two or more lateral faces may be free from lateral parting lines along at least an entire lateral perimeter of at least two lateral surfaces (e.g., outer or inner surface).

In some embodiments, a parting line may have both horizontal and lateral components. For example, a parting line may extend horizontally for a portion and then laterally for a portion. In at least one embodiment described herein, the housing may be without even a lateral portion of a parting line on two or more surfaces.

As shown in FIG. 10, the sliders 303 may include curved portions (not labeled) that may impart a curved and/or radiused surface to the part, as shown. However, the curved portions still abut to create a parting line.

Figure 11:
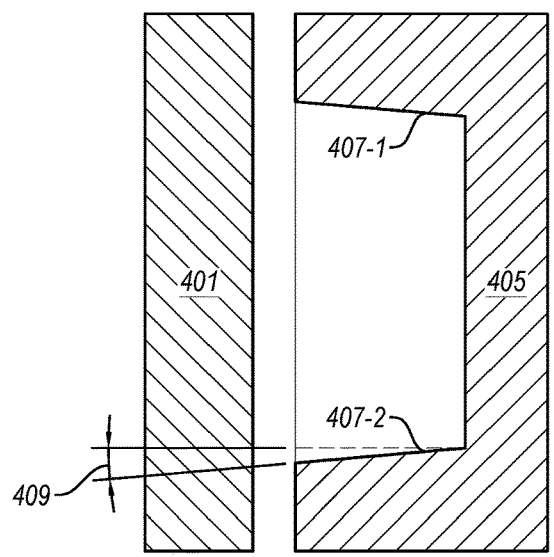
FIG. 11 is a top cross sectional view of another embodiment of a tool assembly for manufacturing a part.
Figure 12:
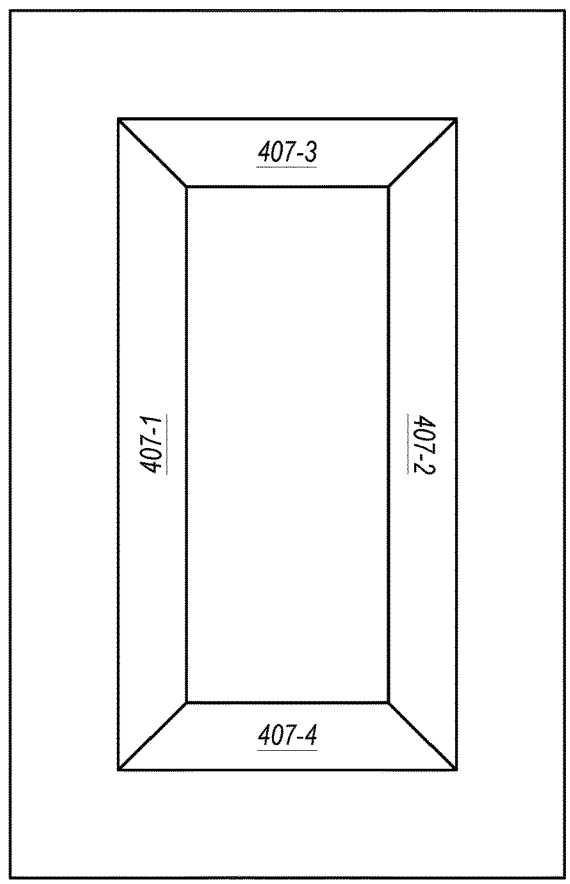
FIG. 12 is a front exploded view of a core of the tool assembly of FIG. 11.

In order to avoid parting lines on two or more lateral surfaces, sliders may be removed from the tool and a two piece tool may be used. As shown in FIG. 11, a cavity 401 and a core 405 may be used. However, the core 405 may include one or more lateral faces 407. As shown in FIGS. 11 and 12, the core 405 includes four lateral faces 407, a first lateral face 407-1, a second lateral face 407-2, a third lateral face 407-3, and a fourth lateral face 407-4. The lateral faces 407 may be oriented with a draft angle 409 from vertical. As shown, the draft angle 409 may be up to five degrees or more. This draft angle 409 may prevent the part getting stuck in the core 405 and may allow for removal of the part without creating lateral parting lines.

Figure 13:
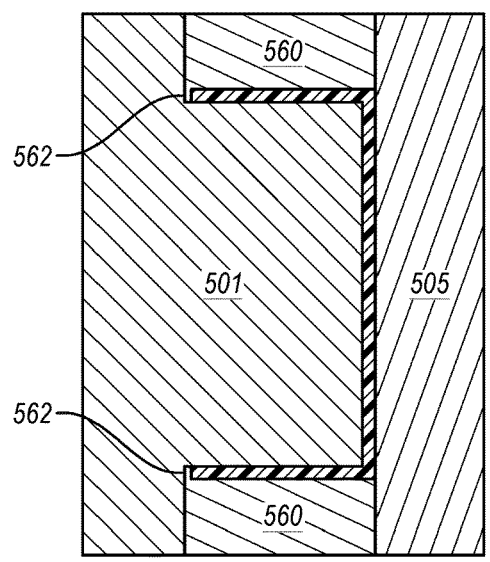
FIG. 13 is a top cross sectional view of a further embodiment of a tool assembly for manufacturing a part.

However, it may be desirable to create parts without a large draft angle and with fewer or zero lateral parting lines. FIGS. 13-17 illustrate a method of manufacturing a housing with a very low draft angle. As shown in FIG. 13, the method includes injecting a material into a tool formed by a cavity 501, a sleeve 560, and a core 505. As shown in FIG. 13, the cavity 501, sleeve 560, and the core 505 abut each other as the material is injected to form a part.

Figure 14:
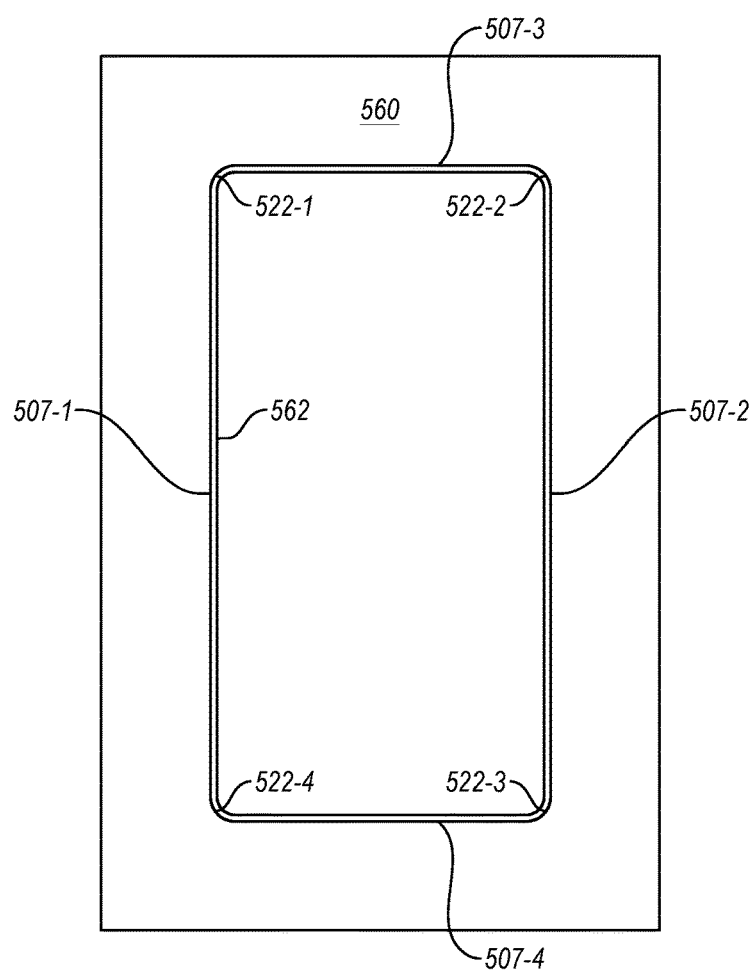
FIG. 14 is a front exploded view of a sleeve of the tool assembly of FIG. 13.

The sleeve 560, as shown in FIG. 14, may encompass an entire lateral perimeter of the part. In other words, the sleeve 560 may have a continuous inner surface. By encompassing the entire lateral perimeter of the part, the part may be formed without lateral parting lines. The sleeve 560 may be formed of various materials. For example, tool steel, stainless steel, hardened steel, or aluminum may be used to form the sleeve 560.

The sleeve 560 may include one or more lateral surfaces 507-1, 507-2, 507-3, 507-4. As shown in FIG. 14, the sleeve 560 includes four lateral surfaces 507-1, 507-2, 507-3, 507-4. The lateral surfaces 507 may include edges. As shown, the edges include a radiuses 552-1, 552-2, 552-3, 552-4. The radiuses 552 are shown as straight and vertical. The radiuses 552 may be encompass the same values and/or ranges as the radiuses 252 described above.

The lateral surfaces 507 are shown as being perpendicular to the upper and lower surfaces (not labeled) and are shown as being straight. In other words, the first lateral surface 507-1 and the second lateral surface 507-2, for example, are parallel to each other as are the third and fourth lateral surfaces 507-3, 507-4 parallel to each other. In some embodiments, two or more surfaces may be parallel to each other to within one degree. In some embodiments, two or more surfaces may be parallel to each other to within 0.5 degrees. In some embodiments, two or more surfaces may be parallel to each other to within 0.25 degrees. In some embodiments, two or more surfaces may be parallel to each other to within 0.1 degrees. In some embodiments, two or more surfaces may be parallel to each other to within 0.01 degrees.

In some embodiments, three or more surfaces may be perpendicular to a single plane and/or parallel to a single line to within 0.01 degrees, 0.1 degrees, 0.25 degrees, 0.5 degrees, one degree, or any range or value therebetween. In other words, the first lateral surface 507-1 may be perpendicular to the plane of the outer surface (not shown) to within 0.01 degrees, 0.1 degrees, 0.25 degrees, 0.5 degrees, one degree, or any range or value therebetween while the second lateral surface 507-1 is perpendicular to the plane of the outer surface (not shown) to within 0.01 degrees, 0.1 degrees, 0.25 degrees, 0.5 degrees, one degree, or any range or value therebetween, and while the third lateral surface 507-3 is perpendicular to the plane of the outer surface (not shown) to within 0.01 degrees, 0.1 degrees, 0.25 degrees, 0.5 degrees, one degree, or any range or value therebetween.

Figure 15:
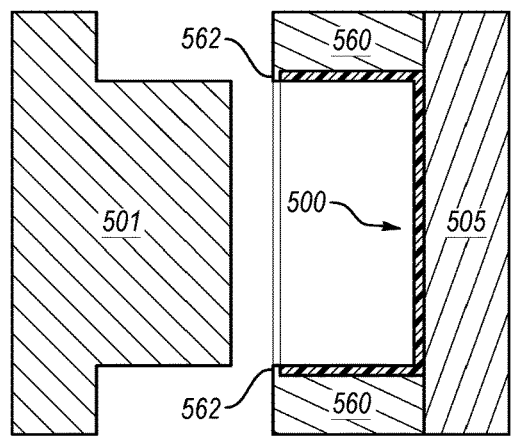
FIG. 15 is a top cross sectional view of the tool assembly of FIG. 13 with a cavity separated from the tool assembly.
Figure 16:
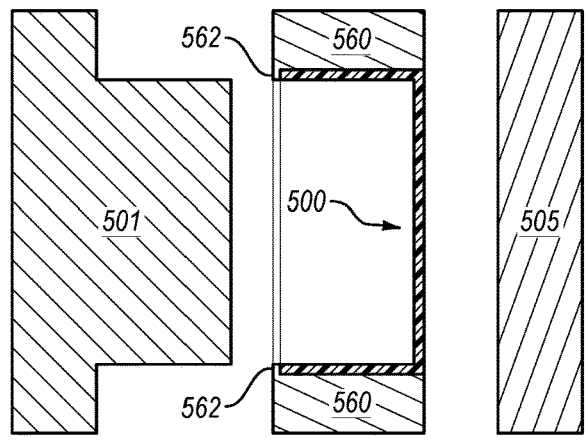
FIG. 16 is a top cross sectional view of the tool assembly of FIG. 13 with a core separated from the tool assembly.

As shown in FIG. 15, the method may include removing the core 505 and the sleeve 560 with the part 500 from the cavity 501. As seen in FIGS. 13-17, the sleeve 560 may include a protrusion (e.g., lip 562). The lip 562, as shown in FIG. 14, may extend around the entire inner periphery of the sleeve 560. In other embodiments, the lip 562 may extend around less than the entire inner periphery. In further embodiments, two or more lips 562 may be used. The lip 562 may allow for the removal of the part 500 from the cavity 501. The lip 562 may extend from the sleeve 560 toward the center of the sleeve 560, as best seen in FIGS. 13 and 15-17. As the sleeve 560 is moved away from the cavity 501, the lip 562 may abut one or more bottommost surfaces (e.g., leftmost in FIGS. 13 and 15-17) of the lateral faces (not labeled) such that the part 500 remains within the sleeve 560 when the sleeve 560 is completely removed from the cavity 501.

Figure 17:
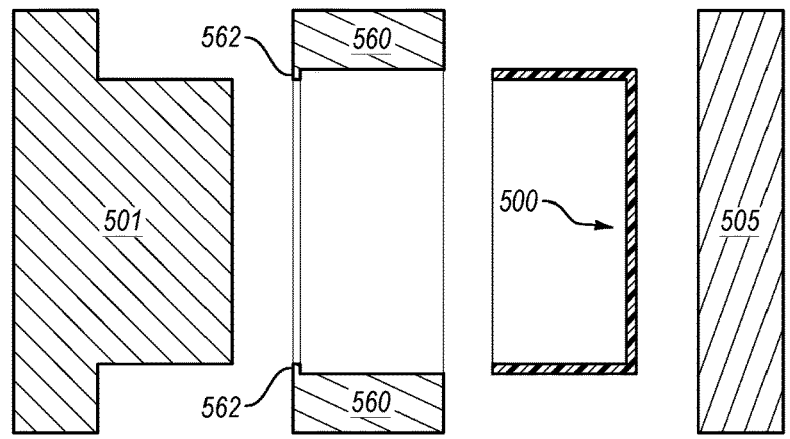
FIG. 17 is a top cross sectional view of the tool assembly of FIG. 13 with a cavity separated from the tool assembly.

The method may include removing the core 505 from the sleeve 560. The sleeve 560 may be connected to the core 505 by, for example, pins, screws, clamps, other fasteners, or combinations thereof. Removing the core 505 may allow removal of the part 500 from the sleeve 560, as shown in FIG. 17. The method may include removing the part 500 from the sleeve 560. The part may be removed by pushing the part 500 from the inside of the sleeve 560 or pulling the part 500 from the sleeve 560.

In at least one embodiment of a housing, two or more lateral faces may be free from parting lines along their entire surface (e.g., outer or inner surface) and the two or more lateral faces may be parallel to within 1 degree. In at least one embodiment of a housing, two or more lateral faces may be free from lateral parting lines along their entire surface (e.g., outer or inner surface) and the two or more lateral faces may be parallel to within 1 degree. In at least one embodiment of a housing, two or more lateral faces may be free from lateral parting lines along at least an entire lateral perimeter of at least two lateral surfaces (e.g., outer or inner surface) and the two or more lateral faces may be parallel to within 1 degree.

In some embodiments, a parting line may have both horizontal and lateral components. For example, a parting line may extend horizontally for a portion and then laterally for a portion. In at least one embodiment described herein, the housing may be without even a lateral portion of a parting line on two or more surfaces and the two or more lateral faces may be parallel to within 1 degree.

One or more components of the embodiments described herein may be provided in a kit. For example, the housings 100, 200, 300, 500 of FIGS. 1-10 and 13-17 may be provided with various internal components, such as transformers or other internal components. In another example, one or more tool components (e.g., cavities 301, 401, 501; cores 305, 405, 505; sliders 303; and sleeves 560) may be incorporated into a kit.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A housing, comprising:
   a plurality of faces and a plurality of surfaces, two of the plurality of surfaces having a draft angle of less than 1 degree;
   wherein at least two of the plurality of surfaces are without parting lines formed by interfacing tool components.

2. The housing of claim 1, wherein the two surfaces having a draft angle of less than 0.5 degrees.

3. The housing of claim 1, wherein the two surfaces having a draft angle of less than 0.25 degrees.

4. The housing of claim 1, wherein the two surfaces having a draft angle of less than 0.1 degrees.

5. The housing of claim 1, wherein electronic components are housed within the housing.

6. The housing of claim 1, wherein the housing is formed of amorphous thermoplastic resin.

7. The housing of claim 1, wherein the housing is formed of one or more of polycarbonate ABS or PCABS blend.

8. The housing of claim 1, wherein the housing is formed of a copolymer polycarbonate PolySiloxane blend.

9. The housing of claim 1, wherein the two or more opposing surfaces have a thickness of less than 1 mm.

10. The housing of claim 1, wherein one or more of the plurality of surfaces does not have mismatched steps.

11. The housing of claim 1, wherein the parting line cannot be visibly seen by the naked eye from 18 inches under CWF lighting while viewing for 5 seconds.

12. The housing of claim 1, wherein an interface between adjacent surfaces of the plurality of surfaces is curved with a radius of curvature greater than 0.5 mm prior to any material removal operation.

13. The housing of claim 1, wherein the housing has a glossy black finish.

14. The housing of claim 1, wherein the housing does not have additional material added to it.

15. A tool for forming a housing, comprising:
   a core;
   a sleeve selectively connectable to the core, the sleeve including:
      a plurality of faces and a plurality of surfaces, two of the plurality of surfaces having a draft angle of less than 1 degree;
      wherein at least two of the plurality of surfaces are continuous; and
   a cavity selectively connectable to the sleeve.

* * * * *